US011136061B2

United States Patent
Toyama et al.

(10) Patent No.: US 11,136,061 B2
(45) Date of Patent: Oct. 5, 2021

(54) CONTROL DEVICE FOR VEHICLE

(71) Applicant: TOYOTA JIDOSHA KABUSHIKI KAISHA, Toyota (JP)

(72) Inventors: Hidetsugu Toyama, Susono (JP);
Osamu Yasuike, Numazu (JP);
Miwanori Oikawa, Susono (JP);
Takahito Ishino, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/597,415

(22) Filed: Oct. 9, 2019

(65) Prior Publication Data
US 2020/0180681 A1    Jun. 11, 2020

(30) Foreign Application Priority Data

Dec. 5, 2018  (JP) .............................. JP2018-228262

(51) Int. Cl.
| B62D 5/04 | (2006.01) |
| B60W 30/02 | (2012.01) |
| B62D 6/00 | (2006.01) |
| B60W 10/20 | (2006.01) |
| B62D 5/00 | (2006.01) |

(52) U.S. Cl.
CPC ........... *B62D 5/0463* (2013.01); *B60W 10/20* (2013.01); *B60W 30/02* (2013.01); *B62D 5/005* (2013.01); *B62D 6/002* (2013.01); *B60W 2710/207* (2013.01)

(58) Field of Classification Search
CPC .................................................... B62D 5/0463
See application file for complete search history.

(56) References Cited

U.S. PATENT DOCUMENTS

| 2017/0267276 A1* | 9/2017 | Kodera ................ B62D 5/0463 |
| 2018/0015945 A1* | 1/2018 | Kim ..................... B62D 5/0463 |
| 2018/0208235 A1* | 7/2018 | Miyashita ............. B62D 5/003 |

FOREIGN PATENT DOCUMENTS

| JP | 2000-159135 A | 6/2000 |
| JP | 2007-326459 A | 12/2007 |

* cited by examiner

*Primary Examiner* — Peter D Nolan
*Assistant Examiner* — Clarence D McCray
(74) *Attorney, Agent, or Firm* — Sughrue Mion, PLLC

(57) ABSTRACT

A vehicle of a steer-by-wire type includes a steering wheel and a turning device configured to turn a wheel. A control device for the vehicle is configured to: calculate a target turn angle being represented as a function of a steering angle of the steering wheel, and control the turning device such that a turn angle of the wheel becomes the target turn angle; receive driver-specified information indicating a specified maximum steering angle that is a maximum value of the steering angle specified by a driver of the vehicle; and flexibly set the function such that the target turn angle calculated according to the specified maximum steering angle is equal to a predetermined maximum turn angle.

6 Claims, 10 Drawing Sheets

1: STEER-BY-WIRE SYSTEM

CONTROL DEVICE FOR VEHICLE

BACKGROUND

Technical Field

The present disclosure relates to a control device for a vehicle of a steer-by-wire type.

Background Art

Patent Literature 1 discloses a steering apparatus of a steer-by-wire type. The steering apparatus includes a steering input device, a steering link mechanism mechanically separated from the steering input device, and a turning actuator that drives the steering link mechanism in response to an operation of the steering input device.

LIST OF RELATED ART

Patent Literature 1: Japanese Unexamined Patent Application Publication No. JP-2007-326459

SUMMARY

A rotatable range of a steering wheel of a vehicle may differ from driver to driver. That is, a maximum steering angle realized by a steering operation by a driver may be different from a predetermined default value (designed value) of maximum steering angle. If the maximum steering angle realized by the steering operation by the driver is different from the default value, the driver feels it difficult to maneuver the vehicle, that is, vehicle maneuverability is lowered. For example, when the maximum steering angle realized by the steering operation by the driver is less than the default value, it is not possible to sufficiently turn a wheel, that is, cornering behavior of the vehicle is limited. This means decrease in vehicle maneuverability.

An object of the present disclosure is to provide a technique that can ensure good vehicle maneuverability for each driver.

A first aspect of the present disclosure is directed to a control device for a vehicle of a steer-by-wire type.

The vehicle includes a steering wheel and a turning device configured to turn a wheel.

The control device is configured to:

calculate a target turn angle being represented as a function of a steering angle of the steering wheel, and control the turning device such that a turn angle of the wheel becomes the target turn angle;

receive driver-specified information indicating a specified maximum steering angle that is a maximum value of the steering angle specified by a driver of the vehicle; and flexibly set the function such that the target turn angle calculated according to the specified maximum steering angle is equal to a predetermined maximum turn angle.

A second aspect further has the following feature in addition to the first aspect.

The driver-specified information further indicates a specified steering range that is a variation range of the steering angle specified by the driver.

The control device is further configured to flexibly set the function such that a variation range of the target turn angle calculated according to the specified steering range is equal to a predetermined turn range.

A third aspect further has the following feature in addition to the second aspect.

The control device is further configured to:

automatically determine a steering angle neutral point being a neutral point of the steering angle, based on the specified steering range; and flexibly set the function such that the target turn angle calculated according to the steering angle neutral point is equal to a predetermined turn angle neutral point.

A fourth aspect further has the following feature in addition to the first or second aspect.

The driver-specified information further indicates a steering angle neutral point that is a neutral point of the the steering angle specified by the driver.

The control device is further configured to flexibly set the function such that the target turn angle calculated according to the the steering angle neutral point is equal to a predetermined turn angle neutral point.

A fifth aspect further has the following feature in addition to any one of the first to fourth aspects.

The vehicle further includes a reaction torque generation device configured to apply a reaction torque to the steering wheel.

The control device is further configured to:

control the reaction torque generation device such that the reaction torque according to the steering angle is applied to the steering wheel; and make the reaction torque in a case where the steering angle is larger than the specified maximum steering angle higher than the reaction torque in a case where the steering angle is equal to or smaller than the specified maximum steering angle.

A sixth aspect further has the following feature in addition to any one of the first to fifth aspects.

The control device is further configured to:

prohibit the vehicle from starting moving during execution of setting of the function; and permit the vehicle to start moving after the setting of the function is completed.

According to the present disclosure, the function between the steering angle and the target turn angle is flexibly set according to specification by the driver. For example, the function is set such that the target turn angle calculated according to the specified maximum steering angle specified by the driver is equal to the predetermined maximum turn angle. As a result, sufficient turning of the wheel is realized by the specified maximum steering angle. That is, good vehicle maneuverability is ensured.

EMBODIMENTS

Embodiments of the present disclosure will be described below with reference to the attached drawings.

1. Steer-by-Wire System

Figure 1:
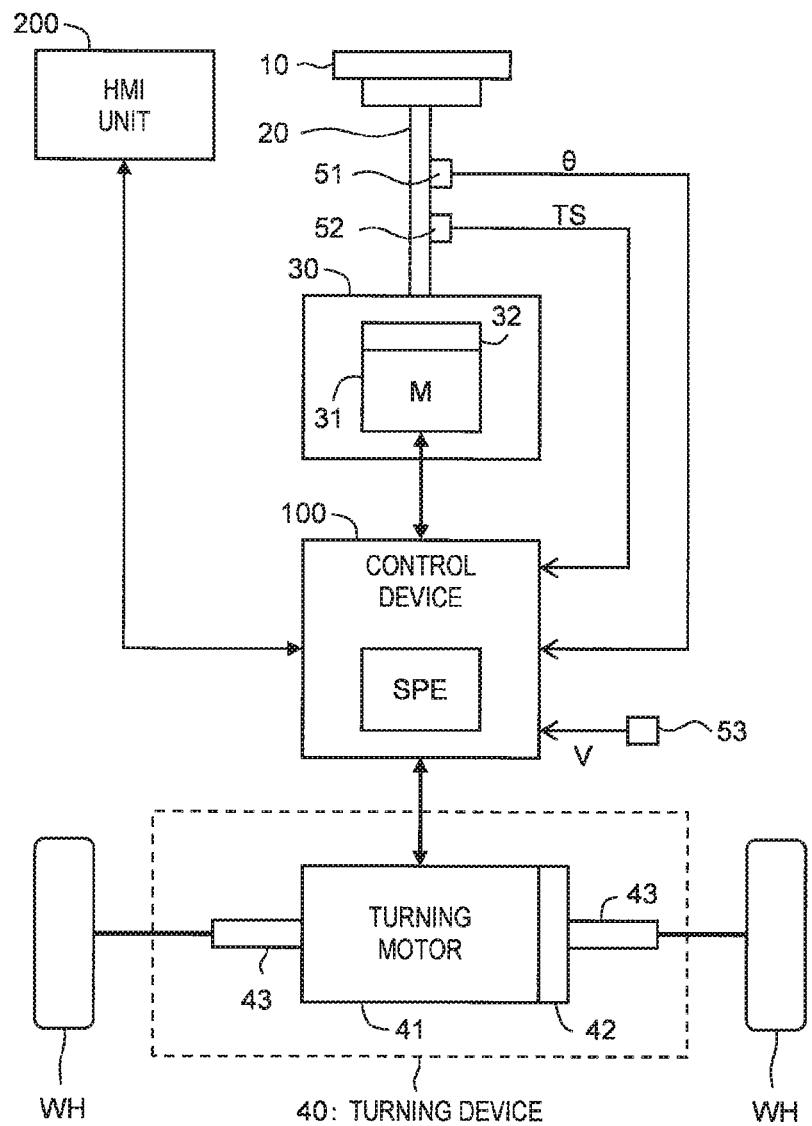
FIG. 1 is a block diagram schematically showing a configuration example of a steer-by-wire system according to an embodiment of the present disclosure.

FIG. 1 is a block diagram schematically showing a configuration example of a steer-by-wire system 1 according to the present embodiment. The steer-by-wire system 1 is installed on a vehicle and turns (i.e. changes a direction of) a wheel WH of the vehicle by a steer-by-wire manner. That is, the steer-by-wire system 1 achieves the vehicle of a steer-by-wire type.

In the example shown in FIG. 1, the steer-by-wire system 1 includes a steering wheel 10, a steering shaft 20, a reaction torque generation device 30, a turning device 40, a group of sensors 51 to 53, a control device (controller) 100, and an HMI (Human Machine Interface) unit 200.

The steering wheel 10 is an operation member that a driver of the vehicle uses for steering. The steering shaft 20 is coupled with the steering wheel 10 and rotates together with the steering wheel 10.

The reaction torque generation device 30 applies a reaction torque TR to the steering wheel 10 in a pseudo manner. More specifically, the reaction torque generation device 30 includes a reaction motor 31 (reaction actuator). A rotor of the reaction motor 31 is connected to the steering shaft 20 through a speed reducer 32. Actuating the reaction motor 31 makes it possible to apply the reaction torque TR to the steering shaft 20 and thus to the steering wheel 10. An operation of the reaction torque generation device 30 is controlled by the control device 100.

The turning device 40 turns the wheel WH. Here, turning the wheel WH means changing a direction of the wheel WH for making a turn. More specifically, the turning device 40 includes a turning motor 41 (turning actuator), a speed reducer 42, and a turning bar 43. A rotor or the turning motor 41 is connected to the turning bar 43 through the speed reducer 42. The turning bar 43 is coupled with the wheel WH. When the turning motor 41 rotates, its rotational motion is converted into a linear motion of the turning bar 43, and thereby the wheel WH turns (i.e. changes its direction). That is, actuating the turning motor 41 makes it possible to turn the wheel WH. An operation of the turning motor 41 is controlled by the control device 100.

It should be noted that the turning device 40 is mechanically separated from the steering wheel 10 and the reaction torque generation device 30 on the steering side.

A steering angle sensor 51 detects a steering angle θ of the steering wheel 10. The steering angle sensor 51 sends information of the detected steering angle θ to the control device 100.

A steering torque sensor 52 detects a steering torque TS applied to the steering shaft 20. The steering torque sensor 52 sends information of the detected steering torque TS to the control device 100.

A vehicle speed sensor 53 detects a vehicle speed V being a speed of the vehicle. The vehicle speed sensor 53 sends information of the detected vehicle speed V to the control device 100.

The control device 100 (i.e. the controller) controls the steer-by-wire system 1 according to the present embodiment. The control device 100 includes a microcomputer provided with a processor, a memory, and an input/output interface. The microcomputer is also called an ECU (Electronic Control Unit). Processing by the control device 100 is achieved by the processor executing a control program stored in the memory.

For example, the control device 100 controls turning of the wheel WH by controlling the operation of the turning device 40 according to rotation (steering) of the steering wheel 10. For example, the control device 100 calculates a target turn angle δ based on the steering angle θ, the vehicle speed V, and so forth. Then, the control device 100 controls the turning device 40 such that a turn angle of the wheel WH becomes the target turn angle δ. More specifically, the control device 100 generates a current control signal for driving the turning motor 41, based on an angle of rotation of the turning motor 41 and the target turn angle δ. The turning motor 41 is driven according to the current control signal, and the wheel WH is turned by the actuation of the turning motor 41.

Moreover, the control device 100 controls the reaction torque TR applied to the steering wheel 10 by controlling the operation of the reaction torque generation device 30 according to rotation (steering) of the steering wheel 10. For example, the control device 100 calculates a target reaction torque based on the steering angle θ, the vehicle speed V, and so forth. Then, the control device 100 controls the reaction torque generation device 30 such that the target reaction torque is generated. More specifically, the control device 100 generates a current control signal for driving the reaction motor 31, based on the target reaction torque, an angle of rotation of the reaction motor 31, the steering torque TS, and so forth. The reaction motor 31 is driven according to the current control signal, and thereby the reaction torque TR is generated.

It should be noted that the control device 100 may separately include a first control device for controlling the turning device 40 and a second control device for controlling the reaction torque generation device 30. In that case, the first control device and the second control device are communicably connected to each other and exchange necessary information with each other.

The HMI unit 200 is an interface for proving the driver with information and receiving information from the driver. More specifically, the HMI unit 200 includes an input device and an output device. The input device is exemplified by a touch panel, a switch, a microphone, and the like. The output device is exemplified by a display device, a speaker, and the like.

2. Flexible Setting of Function Between Steering Angle and Target Turn Angle The target turn angle δ of the wheel WH is represented as a function F of the steering angle θ of the steering wheel 10

(i.e. $\delta=F(\theta)$). Information indicating such the function F is stored in advance in the memory of the control device 100. The control device 100 calculates the target turn angle $\delta$ according to (corresponding to) the steering angle $\theta$ by reference to the function F stored in the memory. Then, the control device 100 controls the turning device 40 such that the turn angle of the wheel WH becomes the target turn angle $\delta$.

The function F between the steering angle $\theta$ and the target turn angle $\delta$ depends also on the vehicle speed V. The target turn angle $\delta$ becomes smaller as the vehicle speed V becomes higher, when compared at the same steering angle $\theta$. It is thus possible to suppress destabilization of vehicle behavior in a state where the vehicle speed V is high.

Hereinafter, the relationship between the steering angle $\theta$ and the target turn angle $\delta$ will be considered. In the following description, a steering range means a variation range of the steering angle $\theta$ of the steering wheel 10. A steering angle neutral point, which is a neutral point (neutral position) of the steering angle $\theta$, is the steering angle $\theta$ of the steering wheel 10 when the vehicle travels in a straight line. A maximum steering angle is a maximum value of the steering angle $\theta$ of the steering wheel 10 when rotating to the right or left, that is, a limit value of the steering range. A sign of the maximum steering angle may be different between the right rotation and the left rotation.

Figure 2:
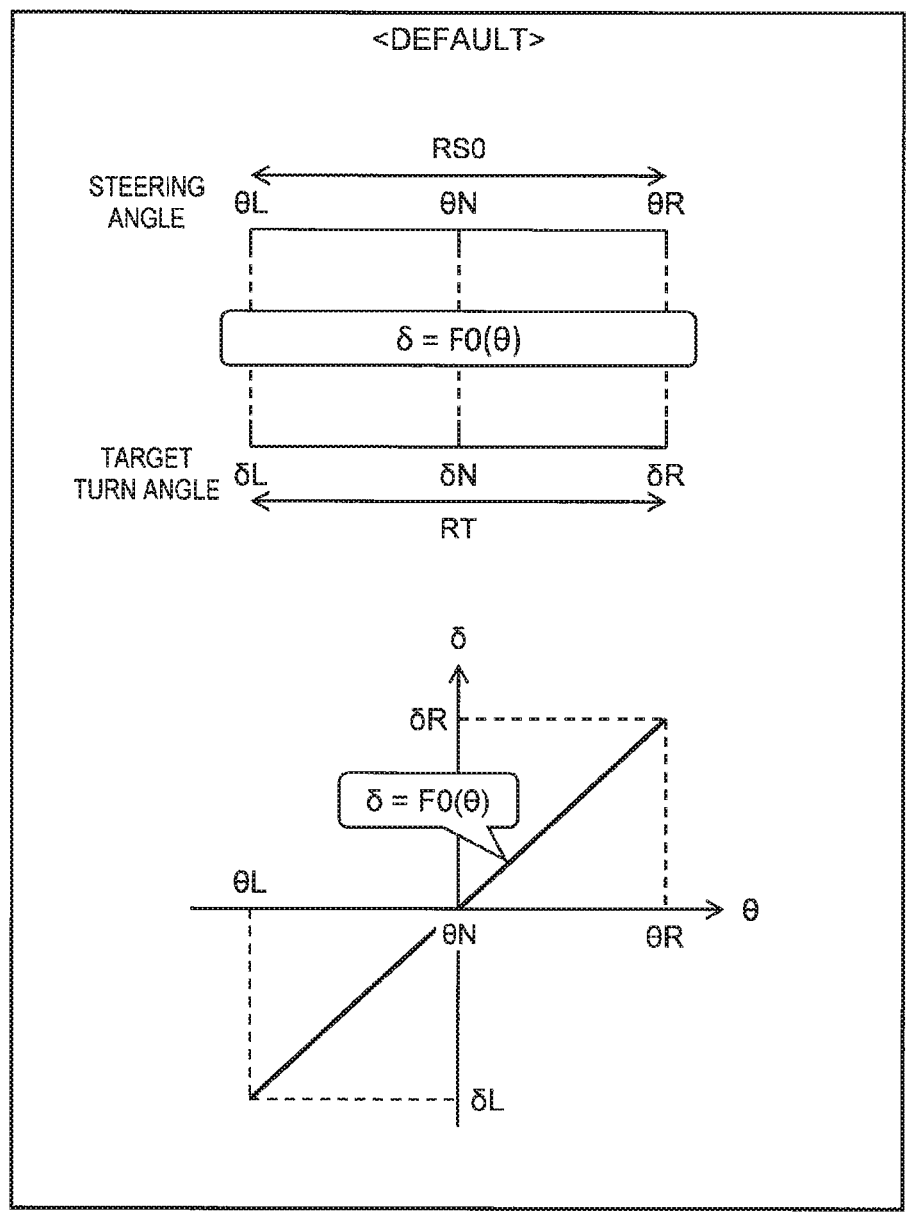
FIG. 2 is a conceptual diagram showing a default setting of a function between a steering angle and a target turn angle according to the embodiment of the present disclosure.

FIG. 2 is a conceptual diagram showing a default setting of the function F between the steering angle $\theta$ and the target turn angle $\delta$. A default steering range RS0 is a default of the steering range (i.e. a designed range). A default steering angle neutral point ON is a default value of the steering angle neutral point. Typically, the default steering angle neutral point ON is a midpoint of the default steering range RS0. A default maximum steering angle $\theta L$ is a default value of the maximum steering angle when rotating to the left. A default maximum steering angle $\theta R$ is a default value of the maximum steering angle when rotating to the right. A range between the default maximum steering angles $\theta L$ and $\theta R$ corresponds to the default steering range RS0.

On the other hand, a turn range RT is a variation range of the turn angle of the wheel WH. A turn angle neutral point $\delta N$ is the turn angle of the wheel WH when the vehicle travels in a straight line (typically, $\delta N=0$). A maximum turn angle $\delta L$ is a maximum value of the turn angle of the wheel WH when turning to the left. A maximum turn angle $\delta R$ is a maximum value of the turn angle of the wheel WH when turning to the right. A range between the maximum turn angles $\delta L$ and $\delta R$ corresponds to the turn range RT. All of the turn range RT, the maximum turn angles $\delta L$ and $\delta R$, and the turn angle neutral point ON are predetermined. For example, the turn range RT, the maximum turn angles $\delta L$ and $\delta R$, and the turn angle neutral point ON are determined in advance for each vehicle type.

For the sake of convenience, the function F in the default setting is designated by "F0" (i.e. $\delta=F0(\theta)$). The default function F0 is initialized such that a variation range of the target turn angle $\delta$ calculated according to the default steering range RS0 ($\theta L$ to $\theta R$) is equal to the predetermined turn range RT ($\delta L$ to $\delta R$). That is, the default function F0 is initialized such that the target turn angles $\theta$ calculated according to the default maximum steering angles $\theta L$ and $\theta R$ are equal to the predetermined maximum turn angles $\delta L$ and $\delta R$, respectively. In addition, the default function F0 is initialized such that the target turn angle $\theta$ calculated according to the default steering angle neutral point $\theta N$ is equal to the predetermined turn angle neutral point $\delta N$.

It should be noted that a rotatable range of the steering wheel 10 of the vehicle may differ from driver to driver. For example, in a case of a driver with a limited range of motion of upper limb, a possible steering range is not necessarily equal to the above-described default steering range RS0. That is, the maximum steering angle realized by a steering operation by the driver may be different from the default maximum steering angles $\theta L$ and $\theta R$ that are predetermined.

If the maximum steering angle realized by the steering operation by the driver is different from the default maximum steering angle ($\theta L$ or $\theta R$), the driver feels it difficult to maneuver the vehicle, that is, vehicle maneuverability is lowered. For example, when the maximum steering angle realized by the steering operation by the driver is less than the default maximum steering angle ($\theta L$ or $\theta R$), it is not possible to sufficiently turn the wheel WH, that is, cornering behavior of the vehicle is limited. This means decrease in vehicle maneuverability.

In view of the above, the present embodiment provides a technique that can ensure good vehicle maneuverability for each driver. For that purpose, according to the present embodiment, the function. F between the steering angle $\theta$ and the target turn angle $\delta$ is not fixed to the default function F0 but is flexibly set according to specification (demand) by the driver.

Figure 3:
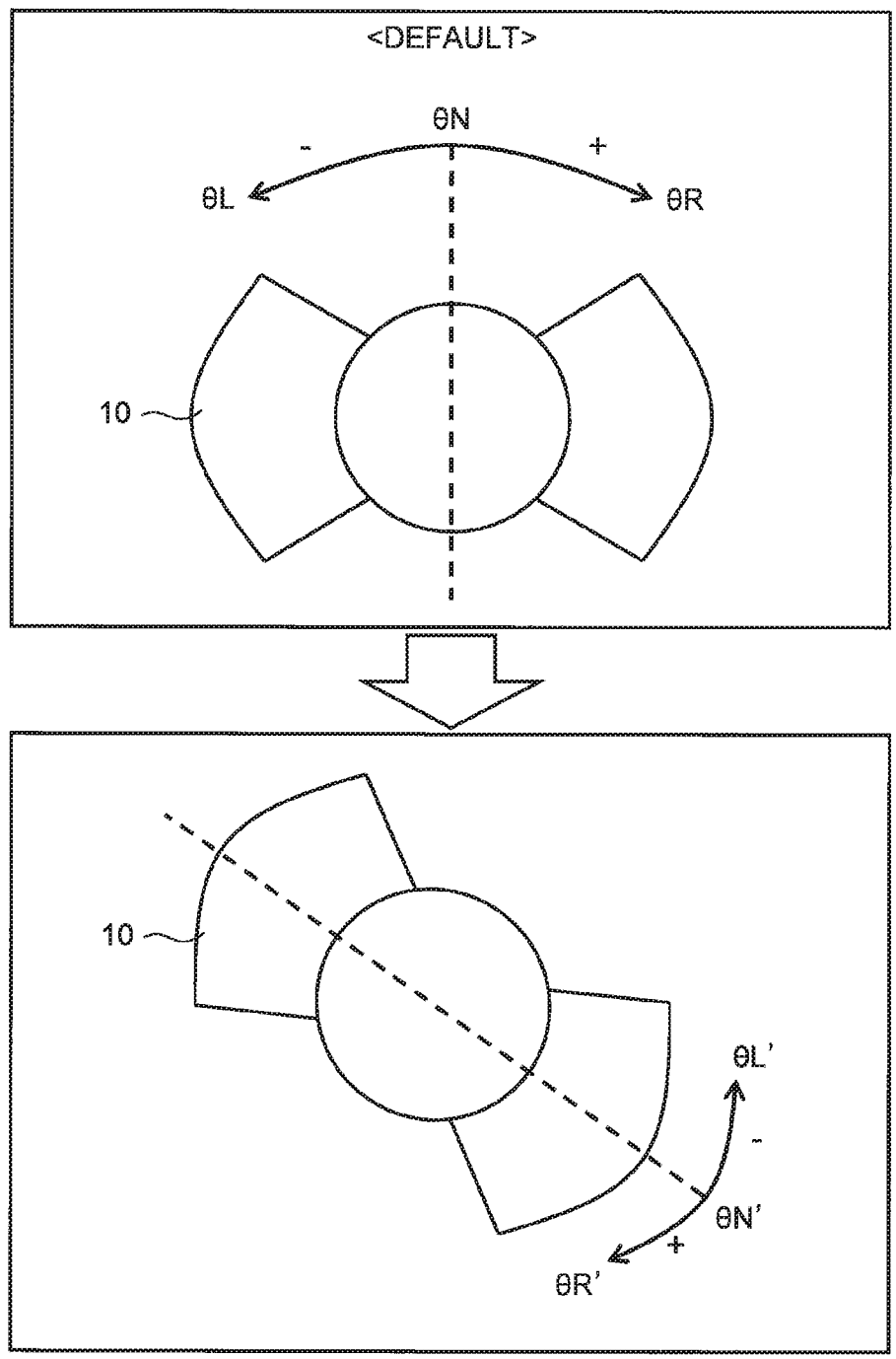
FIG. 3 is a conceptual diagram showing a flexible setting of the function between the steering angle and the target turn angle according to the embodiment of the present disclosure.

FIG. 3 conceptually shows the flexible setting of the function F between the steering angle $\theta$ and the target turn angle $\delta$. A specified maximum steering angle $\theta L'$ is the maximum steering angle when rotating to the left, and is explicitly specified by the driver. A specified maximum steering angle $\theta R'$ is the maximum steering angle when rotating to the right, and is explicitly specified by the driver. A steering angle neutral point $\theta N'$ may be specified by the driver or may be automatically determined based on the specified maximum steering angles $\theta L'$ and $\theta R'$. According to the present embodiment, the function F is flexibly set so that the turning of the wheel WH is sufficiently realized by the specified maximum steering angles $\theta L'$ and $\theta R'$ specified by the driver.

Figure 4:
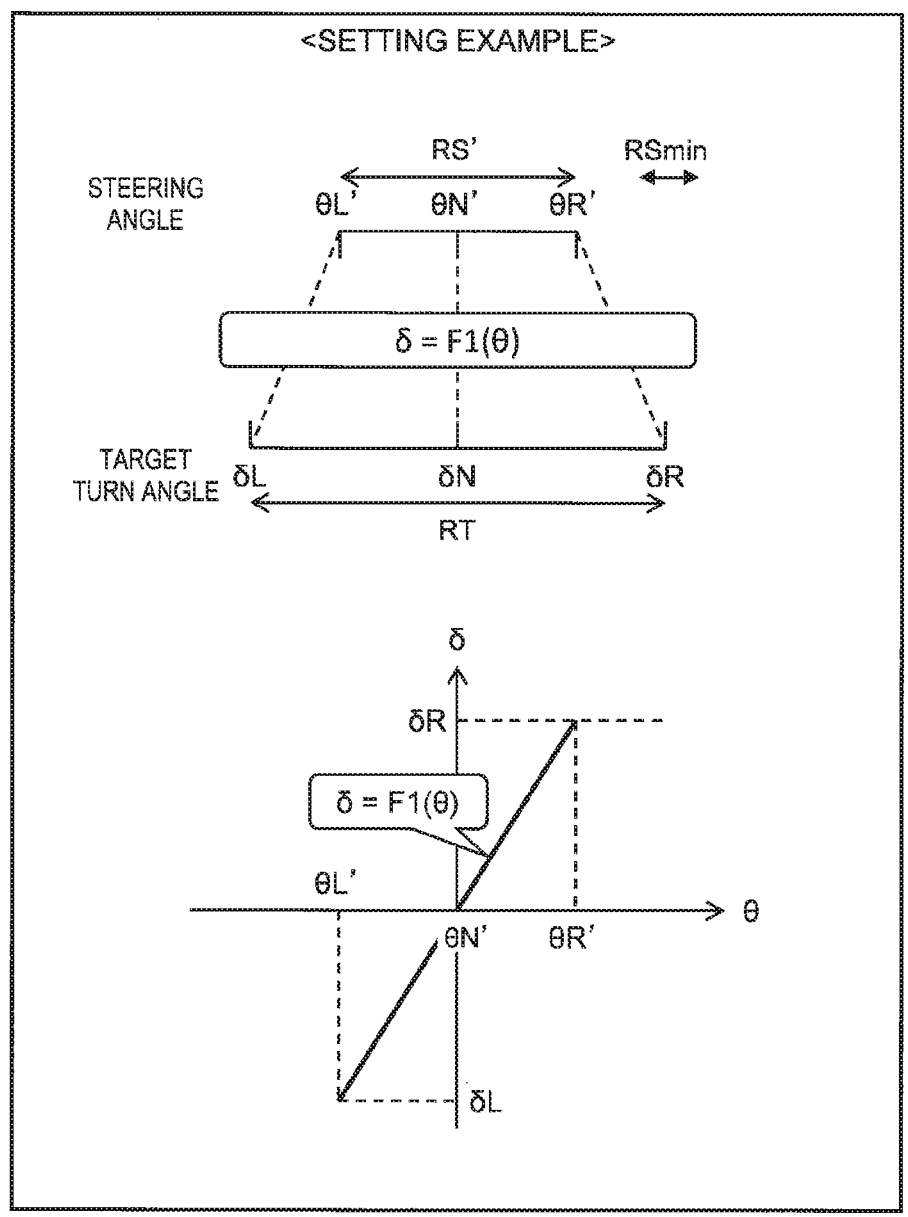
FIG. 4 is a conceptual diagram showing an example of the flexible setting of the function between the steering angle and the target turn angle according to the embodiment of the present disclosure.

FIG. 4 is a conceptual diagram showing an example of the flexible setting of the function F between the steering angle $\theta$ and the target turn angle $\delta$. For the sake of convenience, the function F is designated by "F1" (i.e. $\delta=F1(\theta)$). The function F1 is set such that the target turn angles $\delta$ calculated according to the specified maximum steering angles $\theta L'$ and $\theta R'$ are equal to the predetermined maximum turn angles $\delta L$ and $\delta R$, respectively. Therefore, the cornering behavior of the vehicle is prevented from being limited. Sufficient turning of the wheel WH is realized by the specified maximum steering angles $\theta L'$ and $\theta R'$. That is, good vehicle maneuverability is ensured. In addition, convenience is improved.

A specified steering range RS' is a range between the specified maximum steering angles $\theta L'$ and $\theta R'$. The function F1 is set such that a variation range of the target turn angle $\delta$ calculated according to the specified steering range RS' ($\theta L'$ to $\theta R'$) is equal to the predetermined turn range RT ($\delta L$ to $\delta R$). As a result, good vehicle maneuverability is ensured.

It should be noted that if the specified steering range RS' is too narrow, a response of the wheel WH to an operation of the steering wheel 10 becomes too large, which may cause unstable vehicle behavior. Therefore, an allowable minimum range RSmin is provided as a lower limit value for the specified steering range RS'. The specified steering range RS' is set to be equal to or larger than the allowable minimum range RSmin.

In the example shown in FIG. 4, the steering angle neutral point θN' is a middle position (midpoint) of the specified steering range RS'. In that case, it is possible to automatically determine the steering angle neutral point θN based on the specified steering range RS' (i.e., the specified maximum steering angles θL' and θR'). The function F1 is set such that the target turn angle δ calculated according to the steering angle neutral point θN' is equal to the predetermined turn angle neutral point δN. As a result, the vehicle maneuverability is further increased.

Figure 5:
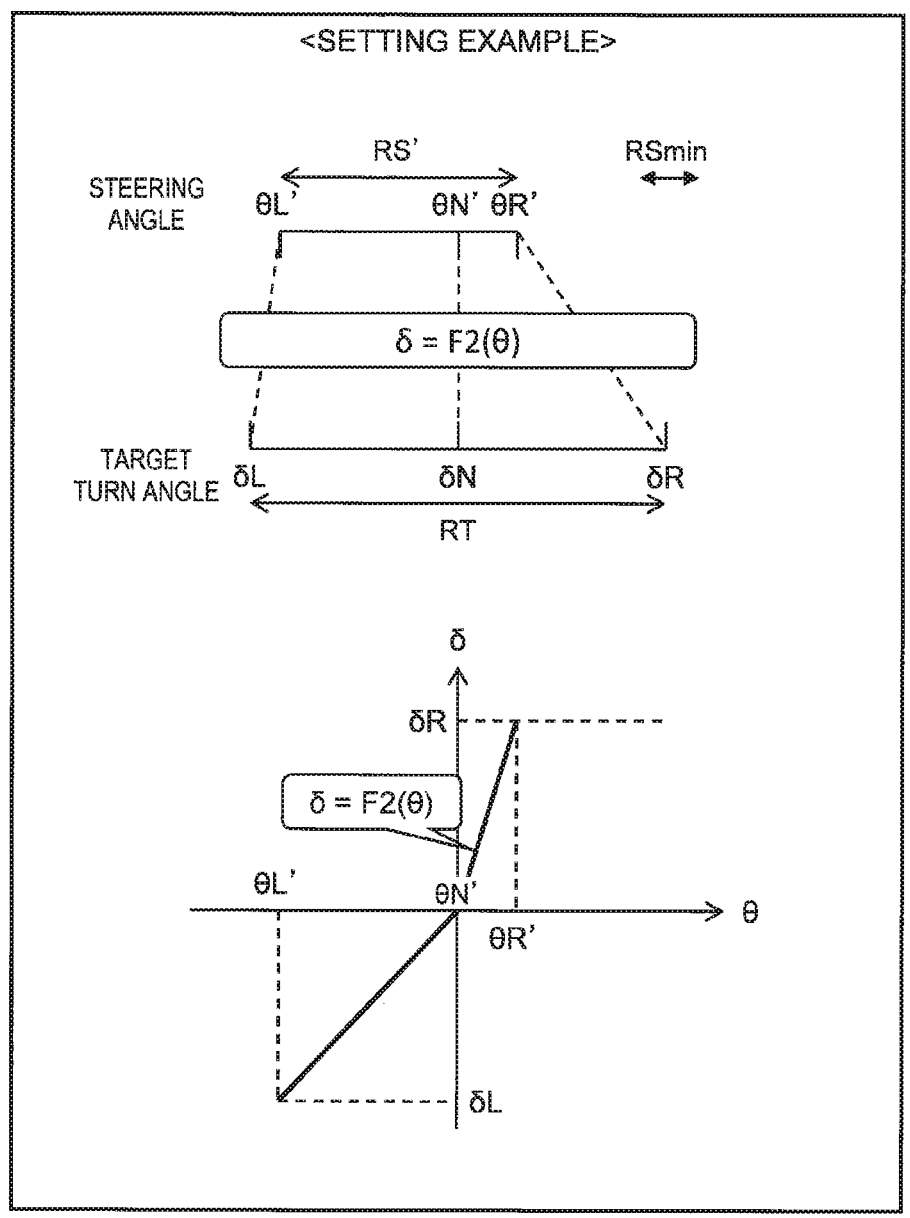
FIG. 5 is a conceptual diagram showing another example of the flexible setting of the function between the steering angle and the target turn angle according to the embodiment of the present disclosure.

FIG. 5 is a conceptual diagram showing another example of the flexible setting of the function F between the steering angle θ and the target turn angle δ. For the sake of convenience, the function F is designated by "F2" (i.e. S=F2(θ)). The steering angle neutral point θN' is not limited to the middle position of the specified steering range RS'. As shown in FIG. 5, the steering angle neutral point θN' can be a position explicitly specified by the driver. The function F2 is set such that the target turn angle δ calculated according to the steering angle neutral point θN' is equal to the predetermined turn angle neutral point δN. Since the driver's demand is reflected also in the steering angle neutral point θN', the vehicle maneuverability and convenience are further increased.

In the example shown in FIG. 5, a slope of the function F2 (i.e. a derivative of the target turn angle δ with respect to the steering angle θ) is discontinuous at the steering angle neutral point θN', As a modification example, the slope of the function F2 may be gradually changed within the specified steering range RS' so as to prevent occurrence of a discontinuous point.

According to the present embodiment, as described above, the function F between the steering angle θ and the target turn angle δ is flexibly set according to specification by the driver. For example, the function F is set such that the target turn angles δ calculated according to the specified maximum steering angles θL' and θR' specified by the driver are equal to the predetermined maximum turn angles δL and δR, respectively. As a result, sufficient turning of the wheel WH is realized by the specified maximum steering angles θL' and θR'. That is, good vehicle maneuverability is ensured.

In addition, the specification by the driver means a demand by the driver. Since a steering wheel operation configuration demanded (desired) by the driver is reflected in the vehicle, convenience for the driver is increased. Moreover, no mechanical modification of the vehicle is necessary for reflecting the driver's demand in the vehicle. Simply changing the function F between the steering angle θ and the target turn angle δ makes it possible to reflect the driver's demand in the vehicle. This is advantageous in terms of costs and convenience.

3. Processing by Control Device

Figure 6:
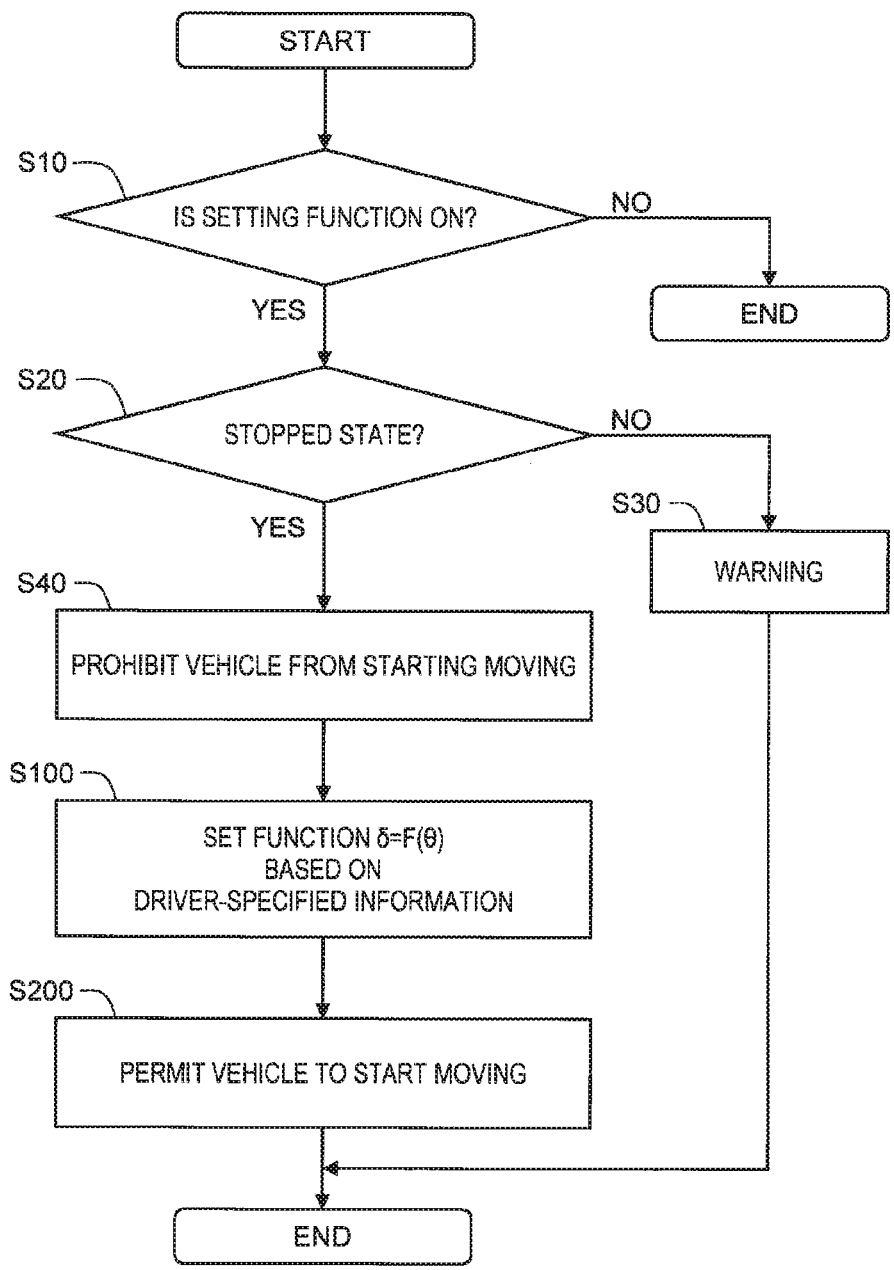
FIG. 6 is a flow chart showing processing by a control device according to the embodiment of the present disclosure.

FIG. 6 is a flow chart showing processing by the control device 100 according to the present embodiment.

In Step S10, the control device 100 determines whether or not a setting function is activated by the driver. The driver can activate the setting function by the use of the HMI unit 200. When the setting function is not activated (Step S10; No) the processing ends. When the setting function is activated (Step S10; Yes), the processing proceeds to Step S20.

In Step S20, the control device 100 determines whether or not the vehicle is in a stopped state. For example, the control device 100 determines whether or not the vehicle is in the stopped state based on the vehicle speed V detected by the vehicle speed sensor 53.

When the vehicle is not in the stopped state (Step S20; No), the control device 100 notifies the driver of a warning through the HMI unit 200 (Step S30). For example, the control device 100 requests the driver to activate the setting function after the vehicle stops.

When the vehicle is in the stopped state (Step S20; Yes), the control device 100 prohibits the vehicle from starting moving (Step S40). After that, the processing proceeds to Step S100.

In Step S100, the control device 100 acquires "driver-specified information SPE". The driver-specified information SPE is information specified by the driver of the vehicle. For example, the driver-specified information SPE indicates the specified maximum steering angles θL' and θR' specified by the driver. The driver-specified information SPE is stored in the memory of the control device 100, and is used in "function setting processing" for setting the function F. In the function setting processing, the control device 100 flexibly sets the function F between the steering angle θ and the target turn angle δ based on the driver-specified information SPE. Various examples of the function setting processing will be described later. After the function setting processing is completed, the processing proceeds to Step S200.

In Step S200, the control device 100 permits the vehicle to start moving. That is, the control device 100 prohibits the vehicle from starting moving during execution of the function setting processing, and permits the vehicle to start moving after the function setting processing is completed. As a result, it is possible to safely execute the function setting processing.

Hereinafter, various examples of the function setting processing (Step S100) by the control device 100 will be described.

3-1. First Example

Figure 7:
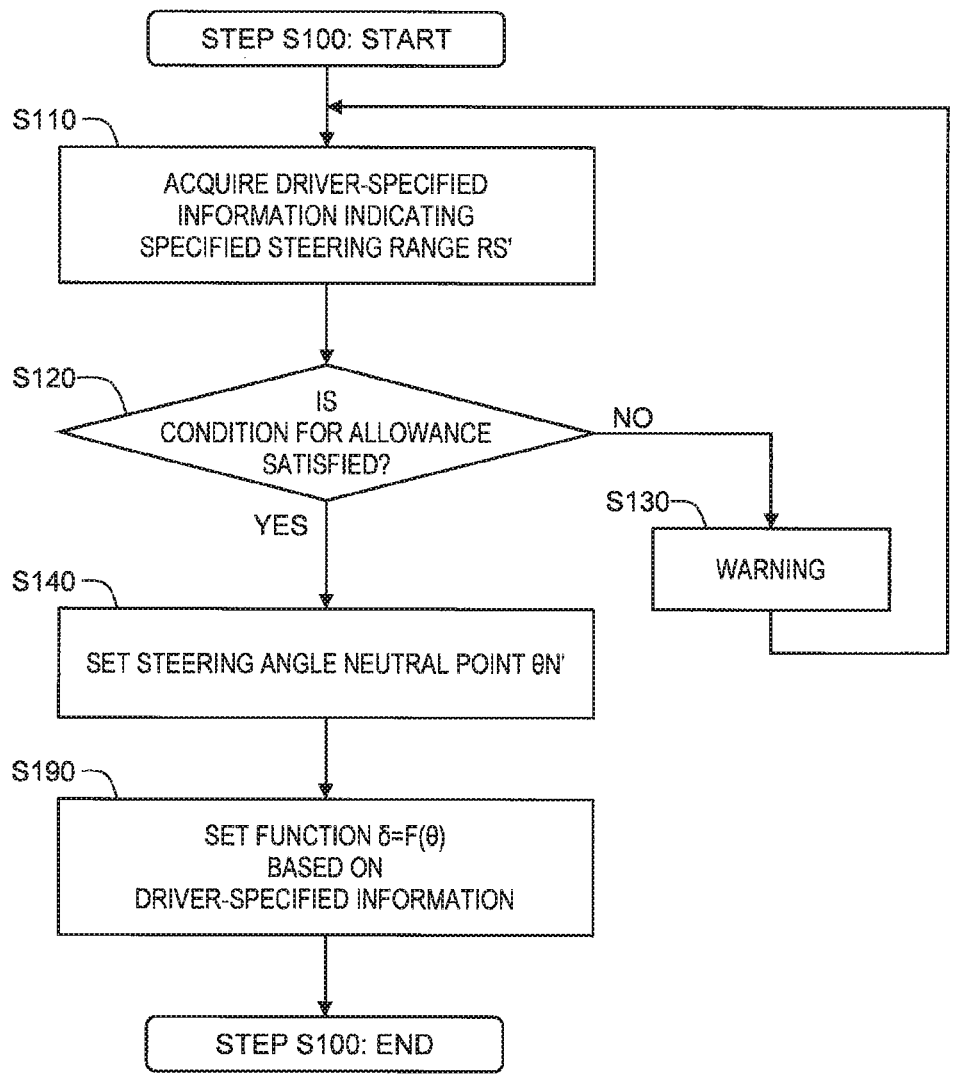
FIG. 7 is a flow chart showing a first example of function setting processing (Step S100) by the control device according to the embodiment of the present disclosure.

FIG. 7 is a flow chart showing a first example of the function setting processing (Step S100).

In Step S110, the control device 100 acquires the driver-specified information SPE indicating the specified steering ranges RS' (i.e., the specified maximum steering angles θL' and θR').

For example, the control device 100 requests, through the HMI unit 200, the driver to rotate the steering wheel 10 to the left and right. The driver repeatedly rotates the steering wheel 10 to the left and right within a desired steering range. Meanwhile, the control device 100 receives detection information of the steering angle θ of the steering wheel 10 from the steering angle sensor 51. The control device 100 recognizes a variation range of the steering angle θ in a certain period of time as the specified steering range RS'. That is, the control device 100 acquires the detection information of the steering angle θ in a certain period of time as the driver-specified information SPE.

As another example, the driver may stop the steering wheel 10 at a desired position and press an OK button displayed on the HMI unit 200. The control device 100 recognizes the steering angle θ at the time when the OK button is pressed, as the specified maximum steering angle θL' or θR'. Also in this case, the driver-specified information SPE is the detection information of the steering angle θ detected by the steering angle sensor 51.

The acquired driver-specified information. SPE is stored in the memory of the control device 100. After that, the processing proceeds to Step S120.

In Step S120, the control device 100 determines whether or not the driver-specified information SPE satisfies a condition for allowance. As described above, if the specified steering range RS' is too narrow, a response of the wheel WH to an operation of the steering wheel 10 becomes too large, which may cause unstable vehicle behavior. Therefore, the allowable minimum range RSmin is provided as the lower limit value for the specified steering range RS'. The condition for allowance is expressed by the following Equation (1).

$$|\theta L' - \theta R'| \geq RS\,min \qquad \text{<Equation (1)>}$$

If the condition for allowance is not satisfied (Step S120; No), the control device 100 notifies the driver of a warning through the HMI unit 200 (Step S130). For example, the control device 100 requests the driver to operate the steering wheel 10 again. Then, the processing returns back to the above-described Step S110. This loop processing may be executed only a certain number of times. If the condition for allowance is not satisfied even after the processing is repeated the certain number of times, the control device 100 may force the function setting processing to quit.

If the condition for alto e is satisfied (Step S120; Yes), the processing proceeds to Step S140.

In Step S140, the control device 100 sets the steering angle neutral point θN'. In the first example, the control device 100 automatically determines the steering angle neutral point θN' based on the specified steering range RS' (i.e. the specified maximum steering angles θL' and θR'). For example, the control device 100 determines the middle position (midpoint) of the specified steering range RS' as the steering angle neutral point θN'. In that ease, the steering angle neutral point θN' is expressed by the following Equation (2).

$$\theta N' = \theta L' + |(\theta L' - \theta R')/2| \qquad \text{<Equation (2)>}$$

In Step S190, the control device 100 flexibly sets the function F based on the driver-specified information SPE. More specifically, the control device 100 sets the function F such that the target turn angles δ calculated according to the specified maximum steering angles θL' and θR' are equal to the predetermined maximum turn angles δL and δR, respectively. Moreover, the control device 100 sets the function F such that a variation range of the target turn angle δ calculated according to the specified steering range RS'(θL' to θR') is equal to the predetermined turn range RT (δL to δR). In addition, the control device 100 sets the function F such that the target turn angle δ calculated according to the steering angle neutral point θN' is equal to the predetermined turn angle neutral point δN.

For example, the control device 100 rewrites the function F stored in the memory. Alternatively, the control device 100 may calculate a correction coefficient of the function F with respect to the default function F0, and store the correction coefficient in the memory. In that case, the control device 100 calculates the target turn angle δ according to the steering angle θ by using the default function F0 and the correction coefficient.

3-2. Second Example

Figure 8:
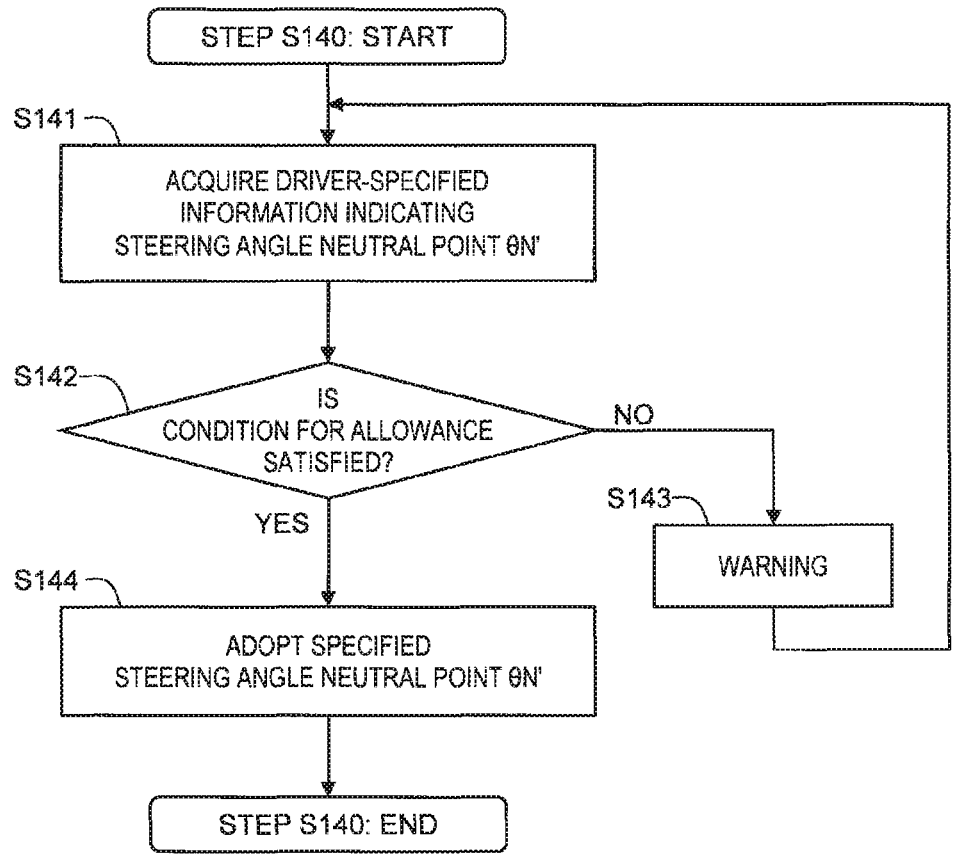
FIG. 8 is a flow chart for explaining a second example of the function setting processing by the control device according to the embodiment of the present disclosure.

A second example differs from the first example in the method of setting the steering angle neutral point θN' (Step S140). The others are the same as in the first example. FIG. 8 is a flow chart showing Step S140 in the second example.

In Step S141, the control device 100 acquires the driver-specified information SPE indicating the steering angle neutral point θN' specified by the driver.

For example, the driver stops the steering wheel 10 at a desired steering wheel neutral position and presses an OK button displayed on the HMI unit 200. The control device 100 recognizes the steering angle θ at the time when the OK button is pressed, as the steering angle neutral point θN'.

As another example, the driver may continue to hold the steering wheel 10 at a desired steering wheel neutral position. When the steering angle θ does not change for a certain period of time, the control device 100 recognizes the steering angle θ as the steering angle neutral point θN'.

The acquired driver-specified information SPE is stored in the memory of the control device 100. After that, the processing proceeds to Step S142.

In Step S142, the control device 100 determines whether or not the driver-specified information SPE satisfies a condition for allowance. The condition for allowance here is expressed by the following Equation (3).

$$|\theta N' - \theta R'| \geq RS\,min/2$$

$$|\theta N' - \theta L'| \geq RS\,min/2 \qquad \text{<Equation (3)>}$$

If the condition for allowance is not satisfied (Step S142; No), the control device 100 notifies the driver of a warning through the HMI unit 200 (Step S143). For example, the control device 100 requests the driver to specify the steering angle neutral point θN' again. Then, the processing returns back to the above-described Step S141. This loop processing may be executed only a certain number of times. If the condition for allowance is not satisfied even after the processing is repeated the certain number of times, the control device 100 may automatically determine the steering angle neutral point θN' by the method described in the first example.

If the condition for allowance is satisfied (Step S142; Yes), the processing proceeds to Step S144. In Step S144, the control device 100 adopts the steering angle neutral point θN' indicated by the driver-specified information SPE.

According to the second example, the driver's demand is reflected also in the steering angle neutral point θN'. Therefore, the vehicle maneuverability and convenience are further increased.

3-3. Third Example

Figure 9:
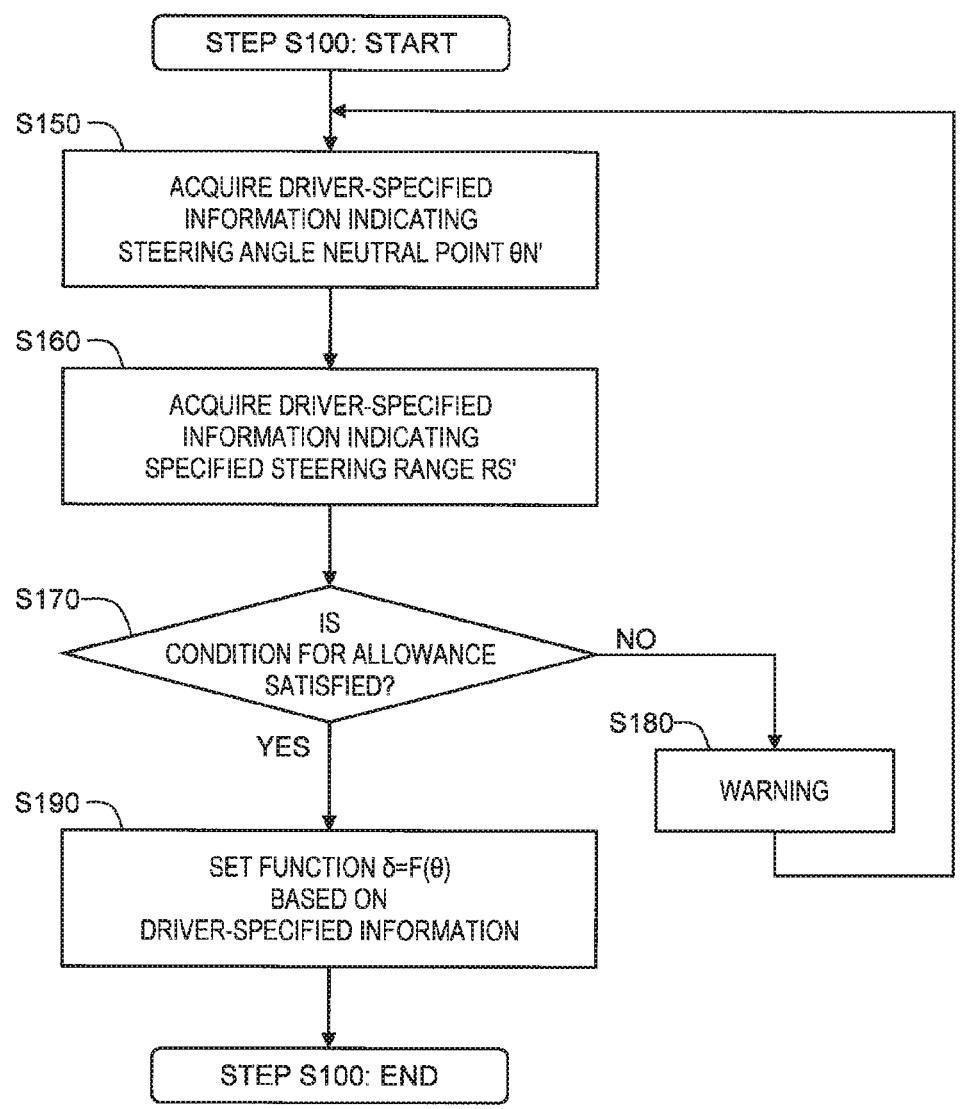
FIG. 9 is a flow chart showing a third example of the function setting processing (Step S100) by the control device according to the embodiment of the present disclosure.

FIG. 9 is a flow chart showing a third example of the function setting processing (Step S100). An overlapping description with the foregoing examples will be omitted as appropriate.

In Step S150, the control device 100 acquires the driver-specified information SPE indicating the steering angle neutral point θN' specified by the driver. Step S150 is the same as Step S141 described above.

In Step S160, the control device 100 acquires the driver-specified information SPE indicating the specified steering ranges RS' (i.e., the specified maximum steering angles θL' and θR'). Step S160 is the same as Step S110 described above.

Thereafter, in Step S170, the control device 100 determines whether or not the driver-specified information SPE satisfies a condition for allowance. The condition for allowance here is the same as the Equation (3) described above.

If the condition for allowance is not satisfied (Step S170; No), the control device 100 notifies the driver of a warning through the HMI unit 200 (Step S180). For example, the control device 100 requests the driver to specify again. Then, the processing returns back to Step S150. This loop processing may be executed only a certain number of times. If the condition for allowance is not satisfied even after the processing is repeated the certain number of times, the control device 100 may force the function setting processing to quit.

If the condition for allowance is satisfied (Step S170; Yes), the processing proceeds to Step S190. Step S190 is the same as in the cases of the foregoing examples.

4. Reaction Torque Control

Figure 10:
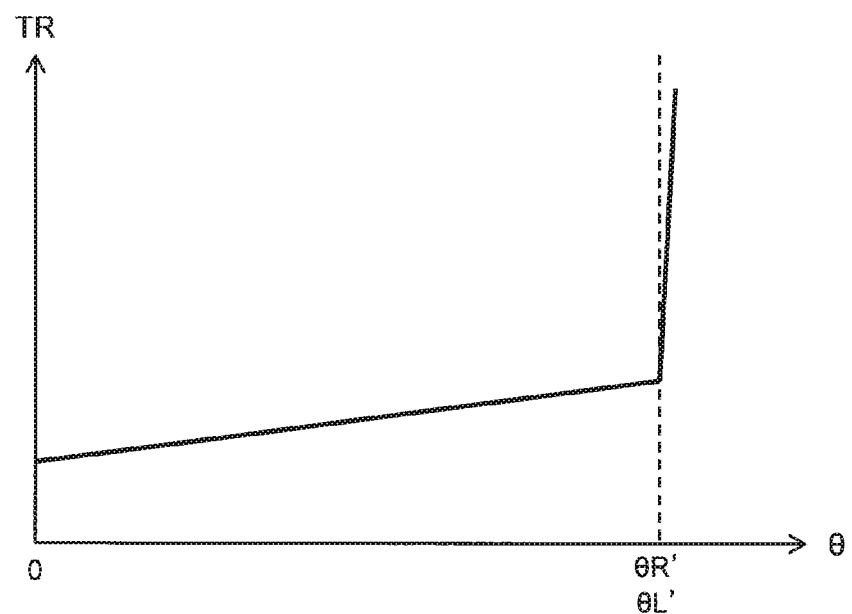
FIG. 10 is a conceptual diagram for explaining an example of reaction torque control by the control device according to the embodiment of the present disclosure.

FIG. 10 is a conceptual diagram for explaining an example of reaction torque control by the control device 100. A horizontal axis represents the steering angle θ (absolute value) of the steering wheel 10, and a vertical axis represents the reaction torque TR generated by the reaction torque generation device 30.

The control device 100 greatly increases the reaction torque TR and a reaction torque slope (i.e. a derivative of the reaction torque TR with respect to the steering angle θ) at the specified maximum steering angle (θR' or θL'). That is, the control device 100 makes the reaction torque TR in a case where the steering angle θ (absolute value) is larger than the specified maximum steering angle higher than the reaction torque TR in a case where the steering angle θ (absolute value) is equal to or smaller than the specified maximum steering angle. In addition, the control device 100 makes the reaction torque slope in the case where the steering angle θ (absolute value) is larger than the specified maximum steering angle higher than the reaction torque slope in the case where the steering angle θ (absolute value) is equal to or smaller than the specified maximum steering angle.

Due to such the reaction torque control, the steering wheel 10 becomes hard to rotate beyond the specified maximum steering angles θR' and θL'. As a result, unnecessary rotation of the steering wheel 10 is prevented, and thus operability of the steering wheel 10 increases.

What is claimed is:

1. A control device for a vehicle of a steer-by-wire type, wherein the vehicle comprises a steering wheel and a turning device configured to turn a wheel, the control device being configured to:
   calculate a target turn angle being represented as a function of a steering angle of the steering wheel, and control the turning device such that a turn angle of the wheel becomes the target turn angle;
   receive driver-specified information indicating a specified maximum steering angle that is a maximum value of the steering angle specified by a driver of the vehicle;
   store the specified maximum steering angle; and
   flexibly set the function such that the target turn angle calculated according to the stored specified maximum steering angle is equal to a predetermined maximum turn angle.

2. The control device according to claim 1, wherein
the driver-specified information further indicates a specified steering range that is a variation range of the steering angle specified by the driver, and
the control device is further configured to flexibly set the function such that a variation range of the target turn angle calculated according to the specified steering range is equal to a predetermined turn range.

3. The control device according to claim 2, wherein
the control device is further configured to:
   automatically determine a steering angle neutral point being a neutral point of the steering angle, based on the specified steering range; and
   flexibly set the function such that the target turn angle calculated according to the steering angle neutral point is equal to a predetermined turn angle neutral point.

4. The control device according to claim 1, wherein
the driver-specified information further indicates a steering angle neutral point that is a neutral point of the steering angle specified by the driver, and
the control device is further configured to flexibly set the function such that the target turn angle calculated according to the steering angle neutral point is equal to a predetermined turn angle neutral point.

5. The control device according to claim 1, wherein
the vehicle further comprises a reaction torque generation device configured to apply a reaction torque to the steering wheel, and
the control device is further configured to:
   control the reaction torque generation device such that the reaction torque according to the steering angle is applied to the steering wheel; and
   make the reaction torque in a case where the steering angle is larger than the specified maximum steering angle higher than the reaction torque in a case where the steering angle is equal to or smaller than the specified maximum steering angle.

6. The control device according to claim 1, wherein
the control device is further configured to:
   prohibit the vehicle from starting moving during execution of setting of the function; and
   permit the vehicle to start moving after the setting of the function is completed.

* * * * *